US012745697B2

(12) United States Patent
Hunt et al.

(10) Patent No.: US 12,745,697 B2
(45) Date of Patent: Sep. 29, 2026

(54) CONDITION MONITORING OF A CONTINUOUS KNIFE ASSEMBLY OF AN AGRICULTURAL HARVESTER

(71) Applicant: CNH Industrial America LLC, New Holland, PA (US)

(72) Inventors: Cory Hunt, Millersville, PA (US); Pieter Van Overschelde, Sint-Andries (BE); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 313 days.

(21) Appl. No.: 18/478,413

(22) Filed: Sep. 29, 2023

(65) Prior Publication Data

US 2024/0107934 A1 Apr. 4, 2024

Related U.S. Application Data

(60) Provisional application No. 63/411,819, filed on Sep. 30, 2022.

(51) Int. Cl.

*A01D 34/00* (2006.01)
*A01D 34/83* (2006.01)
*H04N 7/18* (2006.01)
*H04N 23/90* (2023.01)

(52) U.S. Cl.

CPC ........... *A01D 34/006* (2013.01); *A01D 34/83* (2013.01); *H04N 7/183* (2013.01); *H04N 23/90* (2023.01)

(58) Field of Classification Search

CPC ...... A01D 34/006; A01D 34/83; H04N 23/90; H04N 7/183
USPC ........................................................... 701/50
See application file for complete search history.

(56) References Cited

U.S. PATENT DOCUMENTS

| | | | | |
|---|---|---|---|---|
| 103,136 | A | 5/1870 | Charlesworth et al. | |
| 5,732,539 | A * | 3/1998 | Loftus | A01D 34/833 56/291 |
| 6,931,828 | B2 | 8/2005 | Kormann | |
| 2021/0045288 | A1* | 2/2021 | Sorensen | A01D 34/18 |

FOREIGN PATENT DOCUMENTS

| | | | | |
|---|---|---|---|---|
| CN | 2544510 | | 4/2003 | |
| DE | 102017201423 | A1 * | 8/2018 | A01F 29/22 |
| EP | 2436258 | A1 | 4/2012 | |

(Continued)

OTHER PUBLICATIONS

DE_102017201423_A1 translated (Year: 2017).*
RU_2703914_C1 transklated (Year: 2019).*
EP Application No. 23201087, dated Jun. 14, 2024, 15 pgs.

*Primary Examiner* — Kenneth M Dunne
*Assistant Examiner* — Brian K Palmarchuk
(74) *Attorney, Agent, or Firm* — Fletcher Yoder, P.C.

(57) ABSTRACT

A header for an agricultural harvester including a continuous loop knife and a sensor for sensing conditions of a plurality of knives of the continuous loop knife in increments comprising non-adjacent groups of one or more knives, whereby substantially all of the plurality of knives is sensed after a plurality of cycles of the continuous knife past the sensor. With the header so equipped, a timely determination of wear or damage to the knives in a loop knife cutting system can be made, so that damaged knives may be replaced before significant deterioration of the cutting performance occurs.

18 Claims, 3 Drawing Sheets

(56) References Cited

FOREIGN PATENT DOCUMENTS

| | | | | | |
|---|---|---|---|---|---|
| EP | 2805603 | A1 | | 11/2014 | |
| EP | 3167701 | A1 | * | 5/2017 | ............ A01D 34/38 |
| RU | 2609907 | | | 2/2017 | |
| RU | 2703914 | C1 | * | 10/2019 | ............ A01D 34/83 |

* cited by examiner

CONDITION MONITORING OF A CONTINUOUS KNIFE ASSEMBLY OF AN AGRICULTURAL HARVESTER

The exemplary embodiments of the present invention relate generally to a header of an agricultural harvester and in particular to a header including a sensor for sensing conditions of non-adjacent groups of one or more knives of a continuous loop knife assembly, whereby substantially all of the knives are sensed after a plurality of cycles of the continuous loop knife past the sensor.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism including a plurality of knives that are driven to reciprocate sidewardly relative to a non-reciprocating guard structure known as counterknives. After crops are cut, they flow over crop ramps whereupon they are collected inside the header and transported via a conveyor such as a draper conveyor and/or auger conveyor towards a feederhouse located centrally inside the header. While this is a well-known and well-tested cutting method, the reciprocating motion of the knives of the sickle mechanism has a number of disadvantages. The system is subject to vibrations and high peak forces which can cause premature wear of the knives and/or the counterknives or of the drive mechanism itself. These forces may become excessive, especially in the increasingly large harvesters in use today.

An alternative to reciprocating knives is a so-called belt cutter or loop knife cutter, in which the knives are mounted on a continuously moving endless flexible member or carrier, moving along the front edge of the header. The flexible member, which may be, e.g., a belt, a chain, or the like, is guided by a set of pulleys or sprockets, one of which is actively rotated at a desired speed. The knives move in one direction, once again relative to stationary counterknives, along the front side of the flexible member's path, and move in the opposite direction (i.e. in a loop) along the back side of said path. While vibrations and peak forces are much less of an issue with loop knife cutters, the loop knife solution is vulnerable to other problems. A significant problem is the breaking of knives when an obstruction is encountered in the field, such as a large stone or other solid object.

In presently known loop knife systems, such breaking of knives deteriorates the cutting performance, especially as such defects may remain undetected during a harvesting run. Not only do large defects due to breaking of knives go undetected in this way, but this is the case also for smaller defects or for the failure of knives due to excessive wear.

SUMMARY OF THE INVENTION

In accordance with an exemplary embodiment, the subject disclosure provides a header for an agricultural harvester comprising a continuous loop knife assembly comprising a plurality of knives attached to an endless flexible member, and a sensor configured to sense a condition of the plurality of knives in increments comprising non-adjacent groups of one or more knives, whereby substantially an entirety of the plurality of knives is sensed after a plurality of cycles of the continuous knife past the sensor. The header further comprises a motor operatively engaged with the endless flexible belt for moving the plurality of knives past the sensor.

In accordance with another exemplary embodiment, the subject disclosure provides a header for an agricultural harvester comprising a header for an agricultural harvester comprising a continuous loop knife assembly comprising X knives attached to an endless flexible member; and a sensor for sensing a condition of the X knives according to a knife sampling interval Y. The header further comprises a motor operatively engaged with the endless flexible belt for moving the X knives past the sensor, wherein X is an integer, wherein Y is equal to any integer not equal to X or a factor of X, excluding 1, and wherein X/Y has a remainder that does not share a prime number factor with Y.

In accordance with another exemplary embodiment, the subject disclosure provides a method for monitoring a condition of a plurality of movable knives in a continuous loop knife assembly carried by a header of an agricultural harvester comprising sensing, by a sensor, a condition of the plurality of movable knives in increments comprising non-adjacent groups of one or more knives, whereby substantially an entirety of the plurality of movable knives is sensed after a plurality of cycles of the plurality of movable knives past the sensor. The method further comprises displaying, by a monitor in communication with the sensor, the condition of the plurality of movable knives sensed by the sensor.

In accordance with another exemplary embodiment, the subject disclosure provides a method for monitoring conditions of X movable knives in a continuous loop knife assembly carried by a header of an agricultural harvester comprising sensing, by a sensor, a condition of the X movable knives according to a knife sampling interval Y. The method further comprises displaying, by a monitor in communication with the sensor, the condition of the X movable knives sensed by the sensor according to the knife sampling interval Y, wherein X is an integer, wherein Y is an integer equal to any integer not equal to X or a factor of X, excluding 1, and wherein X/Y has a remainder that does not share a prime number factor with Y.

A header according to the subject disclosure effectively senses and monitors the conditions of the knives of a continuous loop knife by sensing conditions of the plurality of knives in increments comprising non-adjacent groups of one or more knives, whereby substantially an entirety of the plurality of knives is sensed after a plurality of cycles of the continuous loop knife past the sensor.

The subject disclosure enables a timely determination of wear or damage to the knives in a loop knife cutting system, so that damaged knives may be replaced before significant deterioration of the cutting performance occurs. The subject disclosure also allows long term monitoring of the knife conditions, enabling the detection of wear and the efficient planning of maintenance and review of the cutting system.

Other features and advantages of the subject disclosure will be apparent from the following more detailed description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the subject disclosure is not limited to the precise arrangements and instrumentalities shown. In the drawings.

DETAILED DESCRIPTION OF THE DRAWINGS

Figure 1:
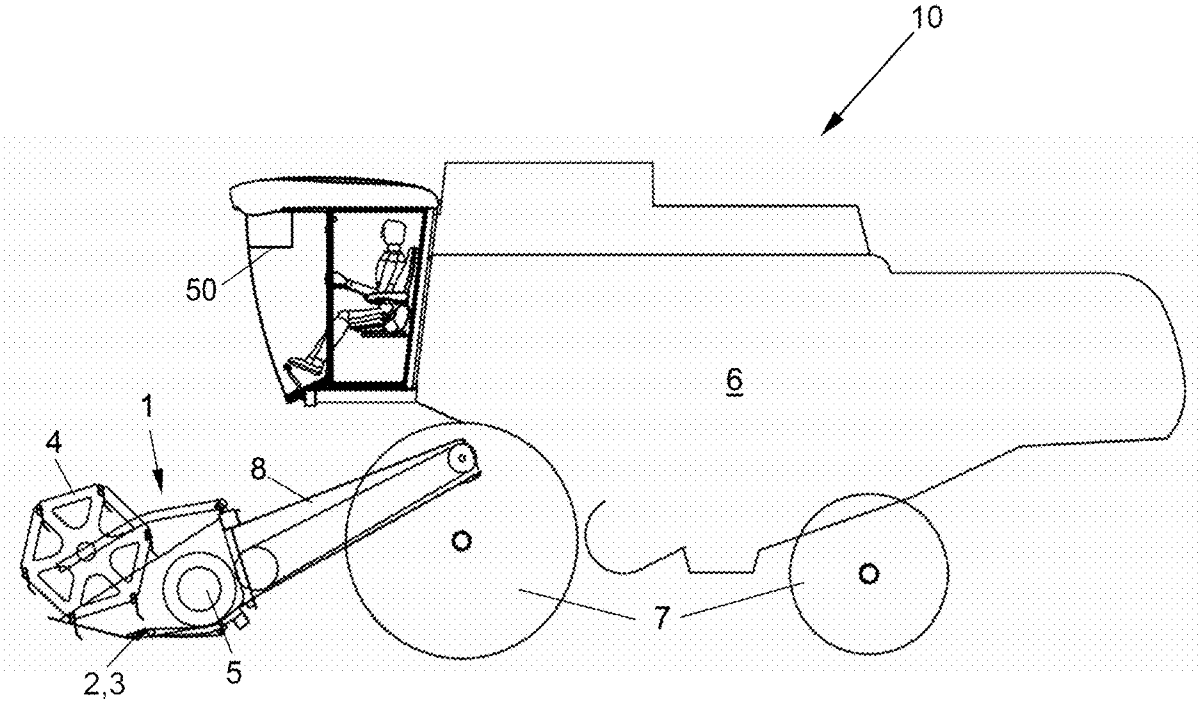
FIG. 1 is a schematic view of a combine harvester, illustrating the position of knives and a cutterbar at the front of the combine header.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term “distal” shall mean away from the center of a body. The term “proximal” shall mean closer towards the center of a body and/or away from the “distal” end. The words “inwardly” and “outwardly” refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term “a,” as used in the specification, means “at least one.” The terminology includes the words above specifically mentioned, derivatives thereof, and words of similar import.

The terms “grain,” “ear,” “stalk,” “leaf,” and “crop material” are used throughout the specification for convenience and it should be understood that these terms are not intended to be limiting. Thus, “grain” refers to that part of a crop which is harvested and separated from discardable portions of the crop material. The header of the subject application is applicable to a variety of crops, including but not limited to wheat, soybeans and small grains. The terms “debris,” “material other than grain,” and the like are used interchangeably.

“About” as used herein when referring to a measurable value such as an amount, a temporal duration, and the like, is meant to encompass variations of ±20%, ±10%, ±5%, ±1%, or ±0.1% from the specified value, as such variations are appropriate.

“Substantially” as used herein shall mean considerable in extent, largely but not wholly that which is specified, or an appropriate variation therefrom as is acceptable within the field of art. “Exemplary” as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring to FIG. 1, a representative agricultural harvester 10 which, e.g., may be a combine harvester, is shown. The agricultural harvester comprises a header 1 mounted at the front of the combine. A plurality of knives 2 and a cutterbar 3, described in greater detail below, are disposed at a front or leading end of the header in the direction of travel of the combine. The knives and the cutterbar are maintained at a given height above ground level while the combine 10 moves through a field of crops that are to be harvested. An optional rotating reel 4 guides the crops towards the knives. Cut crops are transported from both lateral sides of the header 1 towards a central area by an auger 5 (or draper conveyors, not shown). The main body 6 of the combine is supported by front and rear wheels 7 and comprises the threshing rotors and a cleaning section generally known by those of ordinary skill in the art and, as such, are not depicted FIG. 1. From the central area of the header 1, crops are transported into the main body 6 of the combine by a feeder 8.

Figure 2:
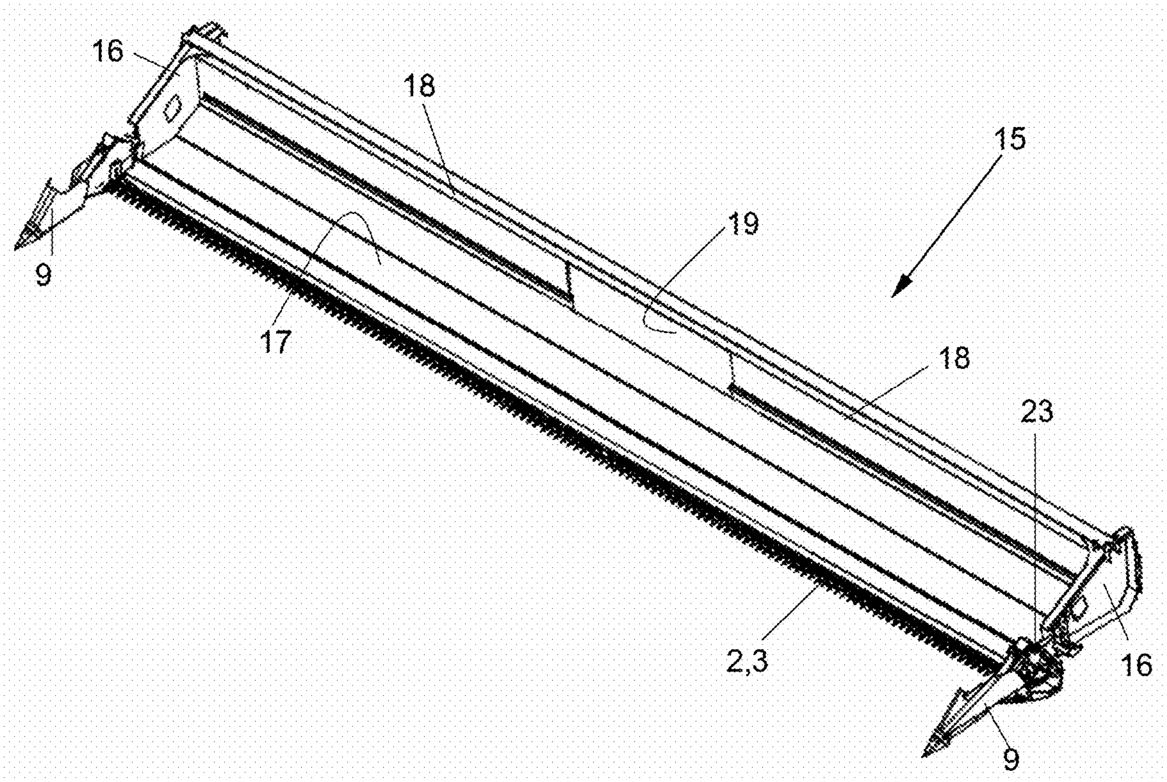
FIG. 2 is a perspective view of a header frame provided with a loop knife cutting system in accordance with an exemplary embodiment of the subject disclosure.
Figure 3:
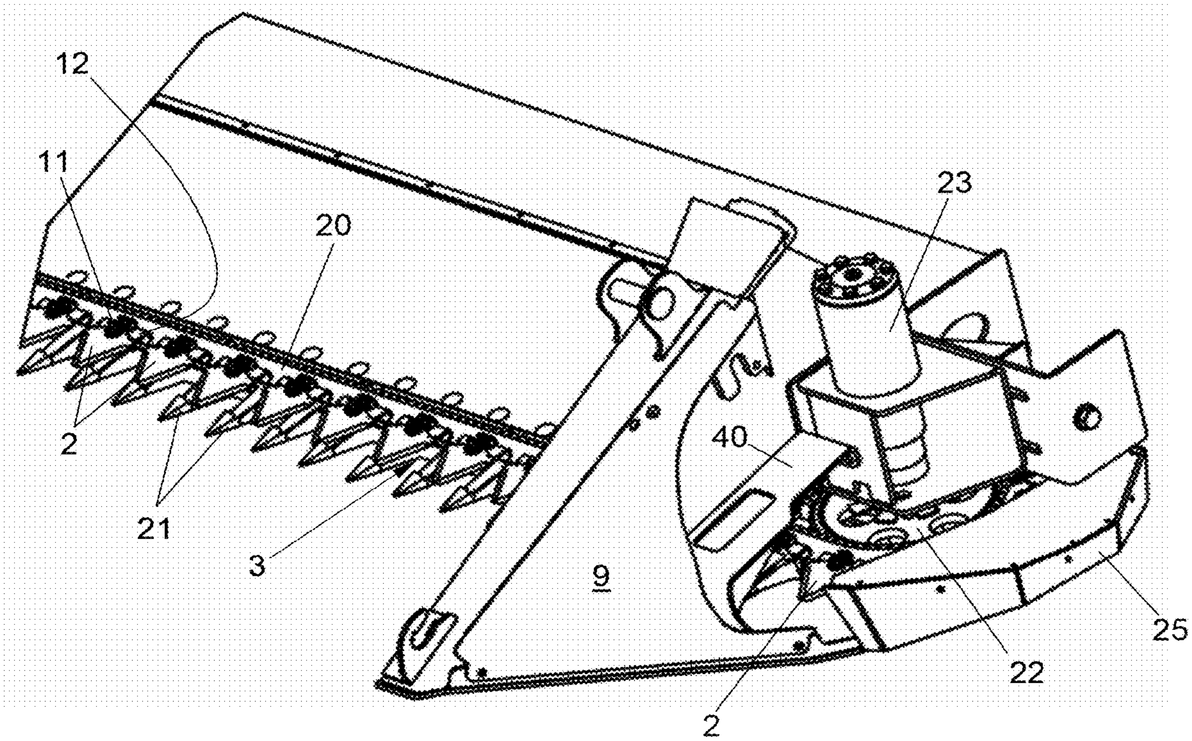
FIG. 3 is an enlarged perspective view of one side of the header frame of FIG. 2.

More detailed views of a header frame 15 provided with a loop knife cutting system are shown in FIGS. 2 and 3. The frame 15 comprises sidewalls 16, a header floor 17 and a back wall 18. The back wall 18 comprises a central opening 19 through which crops are transferred to the feeder, when the header is attached thereto. The knives 2 and the cutterbar 3 extend between laterally placed dividers 9 along the full length of the header. FIG. 3 shows a detailed image of one side of the header frame. In this view, the knives 2 and the cutterbar 3 are clearly shown. The term ‘cutterbar’ is used herein to refer to an assembly of elements which are rigidly connected together. The cutterbar 3 comprises counterknife fingers 21 protruding in the forward direction. In an exemplary embodiment, the header comprises a continuous loop knife assembly comprising a plurality of knives 2 attached to an endless flexible member, e.g., an endless flexible belt or chain 20. According to an aspect, the knives 2 are triangular steel knives mounted on respective support brackets 11 by a bolt connection 12, and these brackets 11 are attached to a lateral surface of the belt 20. Any other known way of attaching the knives 2 to the belt 20 or to an equivalent continuously moving carrier such as a chain, or the like, is contemplated to be within the subject disclosure.

In operation, the knives 2 move continuously past the stationary fingers 21 of the cutterbar 3, to thereby cut crop stalks in the field. The belt 20 is guided by a pair of pulleys 22, one of which is driven actively by a belt drive mechanism such as an actuator or a motor 23. The motor 23 may, for example, be a hydraulic motor or an electric motor, coupled to a respective unillustrated hydraulic or electric power source of the combine harvester. The motor 23 is operatively engaged with the endless flexible belt 20 for moving the plurality of knives past a sensor 26, described below.

As shown in FIG. 3, a protective lateral housing 25 is formed around the knives 2, at the location where they make the 180° turn along the circumference of the pulley 22. This housing 25 serves as a possible location for placing the sensor 26 in a cutting system according to the subject disclosure. As described below, other sensor locations are possible and the subject disclosure is not limited to headers including the housing 25. The illustrated header design is therefore used merely as an example of a possible way of implementing a sensor in accordance with the subject disclosure.

Figure 4:
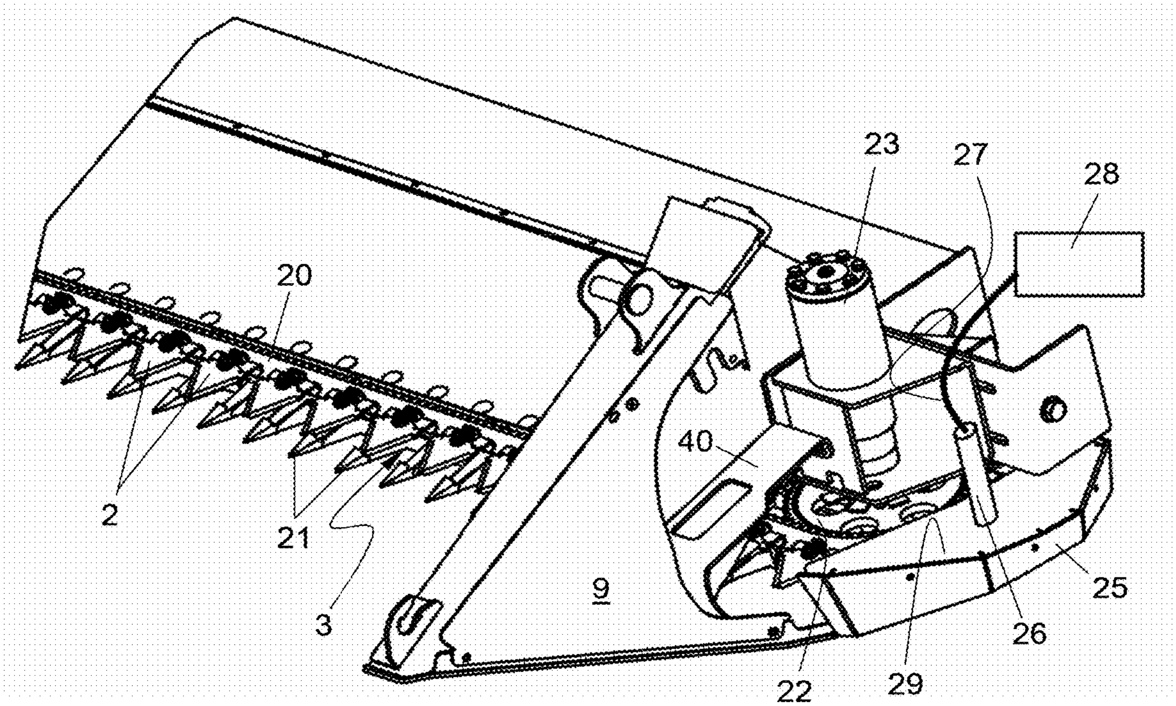
FIG. 4 shows the header frame of FIG. 3 equipped with a sensor for sensing knife conditions in the loop knife cutting system.

FIG. 4 illustrates the sensor 26 mounted on the lateral housing 25. The sensor 26 is schematically represented as a cylinder, in order to indicate the general location of the sensor, given that various sensor types may be used within the scope of the invention. The sensor 26 can be attached to the housing 25 by any suitable attachment mechanism. An opening is made in the upper surface 29 of the housing 25 and the sensor 26 is mounted in the opening, so that the knives 2 pass in front of the sensor 26. An electric wire connection 27 is shown to indicate the way in which a measurement signal issues from the sensor 26 and is transmitted to a processing unit 28, described below. Other types of connections may be used depending on the sensor type, such as wireless connections.

According to the subject disclosure, the sensor 26 is configured to sense a condition of the plurality of knives 2 in increments comprising non-adjacent groups of one of more knives, whereby substantially an entirety of the plurality of knives is sensed after a plurality of cycles of the continuous loop knife assembly past the sensor. As stated, the sensor 26 may be any of various sensor types. According to an exemplary embodiment, a suitable sensor is a visual image recording device such as, e.g., a camera, configured to detect images of knives 2 passing in front of the sensor.

The processing unit 28 is shown symbolically as a rectangle in FIG. 4. Any processing unit known as such in the art for monitoring the output of a visual image recording device type sensor may be used. This unit may be incorporated in a control unit of an agricultural implement such as a combine harvester equipped with a cutting system of the subject disclosure. The processing unit 28 is configured to receive a signal from the sensor 26, process the signal and derive therefrom one or more parameters indicative of the condition of each knife, visible wear or breakage. Other suitable sensors suitable for sensing a condition of the knives 2 and communicating with the processing unit 28 can include, without limitation, inductive sensors, optical, e.g., laser sensors, pneumatic proximity sensors, and infra-red photodiode sensors.

The processing unit 28 is furthermore configured to compare the derived parameters to reference values (such as the reference value, e.g., image, of a non-damaged knife). In doing so, the processing unit produces a result of the comparison that can be interpreted by an operator of the system and/or determines if the comparison exceeds a predetermined threshold value. If the processing unit determines that the comparison exceeds a predetermined threshold value, it can alert the user via an audible signal indicating damage to the knives that requires stopping and reviewing the cutting system. According to another aspect, the sensor can be configured to be in communication with a visual interface or monitor 50 (FIG. 1) for displaying the condition of the plurality of knives sensed by the sensor. Producing such a signal may be based on the degree of damage to individual knives as well as on the number of knives to which a given degree of damage has been detected. The result of the comparison can be reported on the monitor 50, so that the knife condition (degree of damage, number of knives damaged/worn/missing) may be continuously checked by the operator. In a combine harvester, the monitor 50 can be provided in the driver's cabin. The monitor is thus in communication with the sensor for displaying the condition of the plurality of knives sensed by the sensor. The interface or monitor 50 preferably comprises input means allowing the operator to set thresholds in terms of the values of the parameters derived from the detected signals or images, and/or in terms of the number of knives to which a given degree of damage may be allowed before a warning signal is given.

According to an exemplary embodiment, the processing unit is configured to automatically stop the header when it is detected by the sensor that a pre-defined degree of damage is reached or exceeded. According to another exemplary embodiment, the processing unit is configured to report an estimated remaining life time of the knifes, for example by estimating when the average state of wear will be equal to the worn out state, which is the state when average measured length equals the worn out length, based on the evolution of the average state of wear over time. Still further, the processing unit 28 may comprise or be connected to a memory wherein a history of the knife condition may be stored, enabling long term monitoring of wear of the knives, so that maintenance and review can be planned in an efficient way. The operator interpreting or checking the results, can also be outside of the driver's cabin. In particular, an operator can interpret or check the results remotely on a remote visual interface or monitor, for example in case of a remotely controlled combine or in case of an autonomous combine. When the operator is outside of the driver's cabin, the results can be communicated directly to the operator, for example via a network to the operator's computer or via a wireless connection to a wireless device, or indirectly, for example via a cloud service.

Figure 5A:
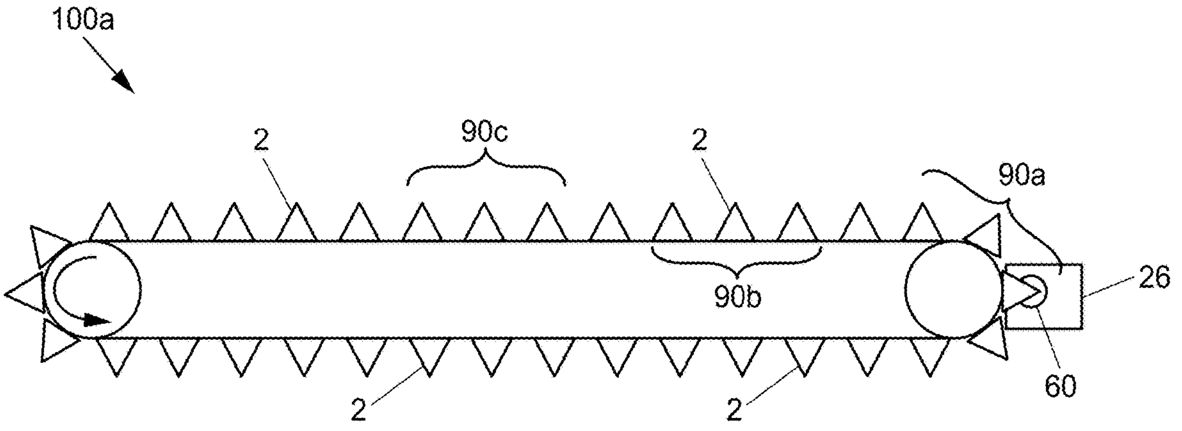
FIG. 5A is a schematic plan view of a loop knife cutter assembly with a sensor adjacent an end of a header frame.

Referring to FIG. 5A, there is shown a continuous loop knife assembly 100*a* with a sensor 26 (in this instance, a camera) positioned generally consistent with the location of the sensor 26 of FIG. 4. The camera of FIG. 5A is configured to have a field of view 60 sufficient to capture an image of a single knife of the plurality of knives in the non-adjacent groups, e.g., 90*a*, 90*b*, 90*c*, etc. of one or more knives. As used herein, "non-adjacent groups of one or more knives" means groups comprising of one or more knives whose conditions are captured by the sensor and which are separated from other groups comprising of one or more knives whose conditions are captured by the sensor by at least one knife whose condition(s) is/are not captured by the sensor.

Figure 5B:
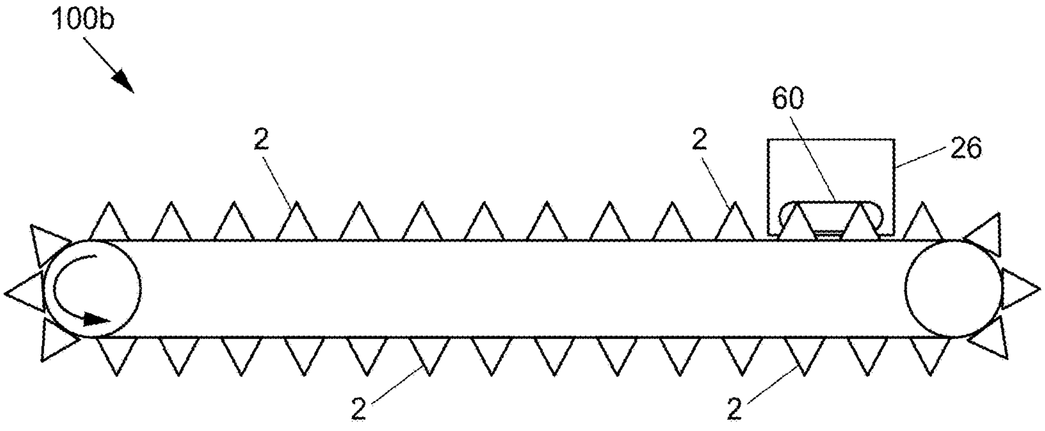
FIG. 5B is a schematic plan view of a loop knife cutter assembly with a sensor intermediate the ends of a header frame.

Referring to FIG. 5B, there is shown a continuous loop knife assembly 100*b* with a sensor 26 (in this instance, a camera) configured to have a field of view 60 sufficient to capture images of adjacent knives of the plurality of knives in non-adjacent groups of one or more knives.

Figure 5C:
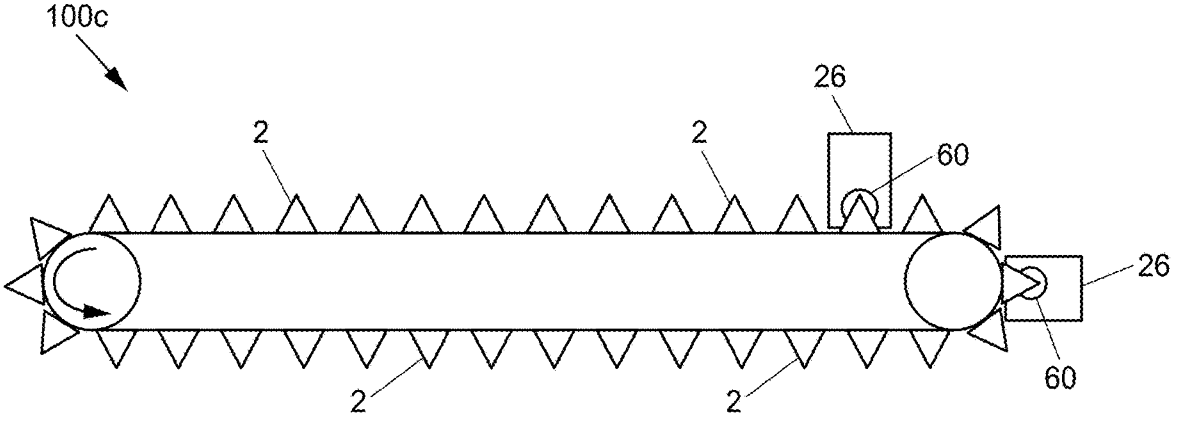
FIG. 5C is a schematic plan view of a loop knife cutter assembly with a sensor at one end of a header frame and another sensor intermediate the ends of the header frame.

Referring to FIG. 5C, there is shown a continuous loop knife assembly 100*c* with a plurality of sensors 26 (in this instance, cameras) each having a field of view for sensing different knives of the plurality of knives in the non-adjacent groups of one or more knives.

The subject disclosure further provides a method for monitoring a condition of a plurality of movable knives 2 in a continuous loop knife assembly 100*a*, 100*b* or 100*c* carried by a header of an agricultural harvester comprising sensing, by a sensor, a condition of the plurality of movable knives in increments comprising non-adjacent groups of one or more knives, whereby substantially an entirety of the plurality of movable knives is sensed after a plurality of cycles of the plurality of movable knives past the sensor. The method further comprises displaying, by a monitor in communication with the sensor, the condition of the plurality of movable knives sensed by the sensor.

The above-described method can further comprise capturing images with the sensor of adjacent knives of the plurality of movable knives in the non-adjacent groups of one or more knives. In addition, the sensor can include a plurality of spaced apart sensors 26, and the method can further comprise sensing different knives of the plurality of movable knives in the non-adjacent groups of one or more knives by the plurality of spaced apart sensors.

In accordance with a further exemplary embodiment, there is provided a header for an agricultural harvester comprising a continuous loop knife assembly 100*a*, 100*b* or 100*c* comprising X knives attached to an endless flexible belt; and a sensor for sensing a condition of the X knives according to a knife sampling interval Y. The header further comprises a motor operatively engaged with the endless flexible belt for moving the X knives past the sensor, wherein X is an integer, wherein Y is equal to any integer not equal to X or a factor of X, excluding 1, and wherein X/Y has a remainder that does not share a prime number factor with Y. According to the subject disclosure, the sensor can be a visual image recording device or camera (or other suitable sensor).

Further, the number, type and placement of the sensor(s) can be as generally set forth in FIGS. 5A-5C. For example, similar to FIG. 5B, the sensor can be a visual image recording device having a field of view sufficient to capture images of adjacent knives of the X knives. Similar to FIG. 5C, the sensor includes a plurality of spaced apart sensors for sensing the condition of spaced apart knives of the X knives. In particular, the plurality of sensors can comprise visual image recording devices having separate fields of view for capturing images of the spaced apart knives of the X knives. In addition, the header can comprise a monitor in communication with the sensor for enabling a user to display the condition of the X knives sensed by the sensor according to the knife sampling interval Y.

The subject disclosure further provides a method for monitoring conditions of X movable knives in a continuous loop knife assembly carried by a header of an agricultural harvester comprising sensing, by a sensor, a condition of the X movable knives according to a knife sampling interval Y. The method further comprises displaying, by a monitor in communication with the sensor, the condition of the X movable knives sensed by the sensor according to the knife sampling interval Y, wherein X is an integer, wherein Y is an integer equal to any integer not equal to X or a factor of X, excluding 1, and wherein X/Y has a remainder that does not share a prime number factor with Y.

The above-described method can further comprise capturing images with the sensor of adjacent knives of the X movable knives. In addition, the sensor can include a plurality of spaced apart sensors, and the method can further comprise sensing a condition of the X movable knives by the plurality of spaced apart sensors. Additionally, the plurality of spaced apart sensors can comprise visual image recording devices having separate fields of view for capturing images of the X movable knives.

By capturing an image of knives at a predetermined interval not equal to an integer fraction of the total number of knives on the loop, the knives that are analyzed will change with each cycle of the plurality of movable knives that passes the sensor. In so doing, all of the knives on the loop will be analyzed before any are repeated. For example, if there are ten knives on the loop and every third knife is analyzed, then during the first cycle, knife numbers 3, 6 and 9 would be analyzed. In the second cycle, knife numbers 2, 5 and 8 would be analyzed, and in the third cycle, knife numbers 1, 4, 7 and 10 would be analyzed.

Similarly, if two adjacent knives are analyzed in one image as in the configuration shown in FIG. 5B, and the loop has twenty total knives, then, e.g., every fifth and sixth knife could be analyzed and a similar pattern could be followed: cycle 1 (knives 5+6, 11+12 and 17+18 would be analyzed), cycle 2 (knives 3+4, 9+10, and 15+16 would be analyzed) and cycle 3 (knives 1+2, 7+8, and 13+14 would be analyzed).

It will be appreciated by those skilled in the art that changes could be made to the exemplary embodiments described above without departing from the broad inventive concept thereof. It is to be understood, therefore, that the subject disclosure is not limited to any particular exemplary embodiments disclosed, but it is intended to cover modifications within the spirit and scope of the subject disclosure as defined by the appended claims.

We claim:

1. A header of an agricultural harvester comprising:

a continuous loop knife assembly comprising a plurality of knives attached to an endless flexible member;

a sensor that senses a condition of the plurality of knives in increments comprising a plurality of non-adjacent groups of the plurality of knives, wherein each non-adjacent group of the plurality of non-adjacent groups comprises two or more adjacent knives of the plurality of knives, and substantially an entirety of the plurality of knives is sensed after a plurality of cycles of the continuous loop knife assembly past the sensor; and a motor operatively engaged with the endless flexible member for moving the plurality of knives past the sensor.

2. The header of claim 1, wherein the sensor is a camera.

3. The header of claim 2, wherein the camera has a field of view sufficient to capture images of adjacent knives of the plurality of knives in the plurality of non-adjacent groups.

4. The header of claim 1, wherein the sensor includes a plurality of sensors that senses different knives of the plurality of knives in the plurality of non-adjacent groups.

5. The header of claim 1, wherein the sensor is in communication with a monitor that displays the condition of the plurality of knives sensed by the sensor.

6. A method of monitoring a condition of a plurality of movable knives in a continuous loop knife assembly carried by a header of an agricultural harvester, the method comprising:

sensing, by a sensor, a condition of the plurality of movable knives in increments comprising a plurality of non-adjacent groups of the plurality of movable knives, wherein each non-adjacent group of the plurality of non-adjacent groups comprises two or more adjacent movable knives of the plurality of movable knives, and substantially an entirety of the plurality of movable knives is sensed after a plurality of cycles of the plurality of movable knives past the sensor, and displaying, by a monitor in communication with the sensor, the condition of the plurality of movable knives sensed by the sensor.

7. The method of claim 6, further comprising capturing images with the sensor of adjacent knives of the plurality of movable knives in the plurality of non-adjacent groups of.

8. The method of claim 6, wherein the sensor includes a plurality of spaced apart sensors; and wherein the method further comprises sensing different knives of the plurality of movable knives in the plurality of non-adjacent groups by the plurality of spaced apart sensors.

9. A header of an agricultural harvester comprising:

a continuous loop knife assembly comprising X knives attached to an endless flexible member;

a sensor that senses a condition of the X knives according to a knife sampling interval Y; and a motor operatively engaged with the endless flexible member that moves the X knives past the sensor, wherein X is an integer, wherein Y is an integer equal to any integer not equal to X or a factor of X, excluding 1, and wherein X/Y has a remainder that does not share a prime number factor with Y.

10. The header of claim 9, wherein the sensor is a visual image recording device.

11. The header of claim 10, wherein the visual image recording device has a field of view sufficient to capture images of adjacent knives of the X knives.

12. The header of claim 9, wherein the sensor includes a plurality of spaced apart sensors that senses the condition of spaced apart knives of the X knives.

13. The header of claim 12, wherein the plurality of sensors comprise visual image recording devices having separate fields of view for capturing images of the spaced apart knives of the X knives.

14. The header of claim 9, wherein the sensor is in communication with a monitor that enables a user to display the condition of the X knives sensed by the sensor according to the knife sampling interval Y.

15. A method of monitoring conditions of X movable knives in a continuous loop knife assembly carried by a header of an agricultural harvester comprising:

sensing, by a sensor, a condition of the X movable knives according to a knife sampling interval Y; and displaying, by a monitor in communication with the sensor, the condition of the X movable knives sensed by the sensor according to the knife sampling interval Y, wherein X is an integer, wherein Y is an integer equal to any integer not equal to X or a factor of X, excluding 1, and wherein X/Y has a remainder that does not share a prime factor with Y.

16. The method of claim 15, further comprising capturing images with the sensor of adjacent knives of the X movable knives.

17. The method of claim 15, wherein the sensor includes a plurality of spaced apart sensors; and wherein the method further comprises sensing a condition of the X movable knives by the plurality of spaced apart sensors.

18. The method of claim 17, wherein the plurality of spaced apart sensors comprise visual image recording devices having separate fields of view that capture images of the X movable knives.

* * * * *